US 6,630,568 B1

(12) United States Patent
Johnson et al.

(10) Patent No.: US 6,630,568 B1
(45) Date of Patent: Oct. 7, 2003

(54) METHOD FOR PURIFICATION OF AROMATIC POLYETHERS

(75) Inventors: Norman Enoch Johnson, Mt. Vernon, IN (US); Raul Eduardo Ayala, Clifton Park, NY (US); Thomas Joseph Fyve, Schenectady, NY (US); Amy Rene Freshour, Putte (NL); David Winfield Woodruff, Clifton Park, NY (US); Peter David Phelps, Schenectady, NY (US); Ganesh Kailasam, Murcia (ES)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/815,583

(22) Filed: Mar. 23, 2001

Related U.S. Application Data

(63) Continuation-in-part of application No. 09/399,538, filed on Sep. 20, 1999, now abandoned.
(60) Provisional application No. 60/128,291, filed on Apr. 8, 1999.

(51) Int. Cl.[7] ................................................ G08F 6/16
(52) U.S. Cl. .................. 528/486; 528/482; 528/491; 528/499; 528/501; 528/502 R; 528/502 A; 528/502 D; 528/503
(58) Field of Search ................... 528/486, 501, 528/502 D, 502 A, 482, 499, 491, 503, 502 R (56) References Cited

U.S. PATENT DOCUMENTS

| 3,787,364 | A | | 1/1974 | Wirth et al. |
|---|---|---|---|---|
| 3,838,097 | A | | 9/1974 | Wirth et al. |
| 3,847,869 | A | | 11/1974 | Williams |
| 5,229,482 | A | * | 7/1993 | Brunelle ..................... 528/125 |
| 5,514,813 | A | | 5/1996 | Brunelle |
| 5,663,275 | A | | 9/1997 | Schmidhouser |
| 5,830,974 | A | | 11/1998 | Schmidhauser et al. |

OTHER PUBLICATIONS van Dort, H.M., et al., "Poly–p–Phenylene Oxide", European Polymer Journal, vol. 4, 275–287 (1968).

Copending application Ser. No. 10/034,866, *Method for Purification of Aromatic Polyethers*.

Percec, V. et al., "*Phase Transfer Catalyzed Polymerization of 4–Bromo–2,6–Dimethylphenol in the Presence of Either 2,4,6–Trimethylphenol or 4–tert–Butyl–2,6–Dimethylphenol*", Journal of Polymer Science: Part A: Polymer Chemistry, vol. 29, pp. 63–82 (1991).

International Search Report for PCT/US 00/25516.

* cited by examiner

*Primary Examiner*—Duc Truong
(74) *Attorney, Agent, or Firm*—Andrew J. Caruso; Patrick K. Patnode

(57) ABSTRACT

Aromatic polyethers are prepared by displacement polymerization reaction in the presence of a water-immiscible solvent with density ratio to water in a range of between about 0.9:1 and about 1.1:1 measured at a temperature in a range of between about 20° C. and about 25° C. The polyethers are purified by processes comprising aqueous extraction, or filtration, or a combination thereof.

79 Claims, 3 Drawing Sheets

Percent of catalyst recovered during extraction versus amount acid added as a function of two temperatures

FIG. 1

Percent of catalyst recovered during extraction versus amount acid added as a function of two temperatures

FIG. 2

Emulsification behavior of water droplets after a second wash in a mixer-settler

FIG. 3

Log normal plot of particle size distribution by number for sodium chloride agglomerates before washing and after evaporation steps

METHOD FOR PURIFICATION OF AROMATIC POLYETHERS

CROSS REFERENCE TO RELATED APPLICATIONS

This application claims the benefit of U.S. Provisional Application No. 60/128,291, filed Apr. 8, 1999, which is incorporated herein by reference. This application is a continuation-in-part of copending U.S. application Ser. No. 09/399,538, filed Sep. 20, 1999, now abandoned which is incorporated herein by reference.

BACKGROUND OF THE INVENTION

The present invention relates to methods for purification of aromatic polyethers, and more particularly to methods for purification of aromatic polyetherimides.

Various types of aromatic polyethers, particularly polyetherimides, polyethersulfones, polyetherketones, and polyetheretherketones have become important as engineering resins by reason of their excellent properties. These polymers are typically prepared by the reaction of salts of dihydroxyaromatic compounds, such as bisphenol A (BPA) disodium salt, with dinitroaromatic molecules or dihaloaromatic molecules. Examples of suitable dihaloaromatic molecules include bis(4-fluorophenyl)sulfone, bis(4-chlorophenyl)sulfone, and the analogous ketones and bisimides as illustrated by 1,3-bis[N-(4-chlorophthalimido)] benzene.

According to U.S. Pat. No. 5,229,482, the preparation of aromatic polyethers by displacement polymerization may be conducted in the presence of a relatively non-polar solvent, using a phase transfer catalyst which is substantially stable under the temperature conditions employed. Suitable catalysts include ionic species such as guanidinium salts. Suitable solvents disclosed therein include o-dichlorobenzene, dichlorotoluene, 1,2,4-trichlorobenzene and diphenyl sulfone. A particularly preferred solvent is a monoalkoxybenzene such as anisole as disclosed in U.S. Pat. No. 5,830,974.

It is desirable to isolate aromatic polyether from a reaction mixture free from contaminating species that may affect the polymer's final properties in typical applications. In a typical halide displacement polymerization process contaminating species often include alkali metal halide and other alkali metal salts, residual monomer species, and residual catalyst species. For maximum efficiency of operation it is desirable to recover any solvent employed and other valuable compounds such as catalyst species, and to provide waste streams which do not contaminate the environment. In particular it is often desirable to recover alkali metal halide, especially sodium chloride, for recycle to a brine plant for production of sodium hydroxide and chlorine.

Many conventional techniques are used to purify polymer-containing organic solutions. For instance, extraction with water and settling by gravity in a mixer/settling tank have been used for removal of aqueous-soluble species. However, water extraction methods will not work when the water phase emulsifies with or does not phase separate efficiently from the organic phase. The particular case of polyethers in anisole solutions presents special difficulties when mixing with water and separating by settling. Pure water typically will not separate from anisole or polymer/anisole solutions after mixing near room temperature because the difference between water and anisole densities is very small. Under these conditions emulsions may form. Even if the first stage of extraction is performed under conditions where density differences drive the separation of water (for example, treatment with brine), the final stage of extraction of water-soluble species still requires use of relatively pure water, which is more prone to emulsification. The end result is that even though alkali metal halide and/or catalyst may be transferred to the aqueous phase, the entrained water in the emulsified organic phase prevents a high recovery of both the halide and the catalyst. High purity polymer solutions with minimal residual species may then be extremely difficult if not impossible to obtain. Variations in either temperature of operation in the range of between about 20° C. and about 100° C. or in polymer concentration may promote settling due to density differences, but the presence of surface-active functional groups on the polymer may still promote emulsification, particularly the presence of ionic end-groups such as phenoxide and/or carboxylate left uncapped from the polymerization process. Another constraint is that the time for separation of the aqueous and organic phases must be fast, preferably on the order of minutes, so that separation rates do not slow down production. A method is needed that minimizes emulsification and is relatively fast for phase separation of the water and organic phases.

Dry filtration via filters or membranes has also been employed for the removal of relatively large suspended solids from polymer-containing organic solutions. The advantage is that no process water is needed, but the disadvantage is that the filter type has to be chosen carefully to avoid a high pressure drop as the solids cake builds. Filtration is not feasible if the solid particles plug, blind, or go through the porous filter media. Easy back flushing of the filter is also required for fast turn-around and repeated use. Alkali metal halides, such as sodium chloride, are typically insoluble in organic solvents such as anisole, but such halides may be present as small suspended solid crystals that are difficult to remove by standard filtration methods. Furthermore, residual monomer species such as alkali metal salts of monomer or complexes of catalyst and monomer may also be present which often cannot be efficiently removed by filtration alone.

Because of the unique separation problems involved, new methods are needed for efficiently separating aromatic polyether products from contaminating species in relatively non-polar solvents which have density similar to that of water. Methods are also required for recycling the solvent and for recovering useful catalyst and alkali metal halide species from any final waste stream.

BRIEF SUMMARY OF THE INVENTION

After careful study the present inventors have discovered methods for purifying aromatic polyethers prepared in water-immiscible solvents with densities close to that of water. These new methods also provide efficient recovery of solvent, alkali metal halide, and valuable catalyst species.

In one of its embodiments the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:

(a) quenching the reaction mixture with acid; and
(b) extracting the organic solution at least once with water.

In another of its embodiments the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:

(a) quenching the reaction mixture with acid; and (b) adding water to the mixture to effect agglomeration of solid species comprising alkali metal halide; and (c) separating the solid species by a solid separation method.

In another of its embodiments the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:

(a) subjecting the mixture to at least one solid separation step;

(b) then quenching the mixture with acid; and (c) extracting the organic solution at least once with water.

In still another of its aspects the present invention provides a method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising:at least one filtration step, and at least one ion exchange step.

DETAILED DESCRIPTION OF THE INVENTION

The polyethers of the present invention are typically derived from combining at least one dihydroxy-substituted aromatic hydrocarbon moiety and at least one substituted aromatic compound of the formula $$Z(A^1-X^1)_2 \quad (I)$$

wherein Z is an activating radical, $A^1$ is an aromatic radical and $X^1$ is fluoro, chloro, bromo, or iodo, in the presence of a catalytically active amount of a phase transfer catalyst. In one suitable procedure an alkali metal salt of the at least one dihydroxy-substituted aromatic hydrocarbon is combined with the at least one substituted aromatic compound of generic formula (I). The alkali metal salts of dihydroxy-substituted aromatic hydrocarbons which are employed are typically sodium or potassium salts. Sodium salts are frequently preferred by reason of their availability and relatively low cost. Said salt may be employed in anhydrous form. However, in certain instances the employment of a hydrate, such as the hexahydrate of the bisphenol A sodium salt, may be advantageous provided water of hydration is removed before the substituted aromatic compound is introduced.

Suitable dihydroxy-substituted aromatic hydrocarbons include those having the formula $$HO-A^2-OH \quad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^2$ radical preferably has the formula $$-A^3-Y-A^4-, \quad (III)$$

wherein each of $A^3$ and $A^4$ is a monocyclic divalent aromatic hydrocarbon radical and Y is a bridging hydrocarbon radical in which one or two atoms separate $A^3$ from $A^4$. The free valence bonds in formula III are usually in the meta or para positions of $A^3$ and $A^4$ in relation to Y. Compounds in which $A^2$ has formula III In are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III, the $A^3$ and $A^4$ values may be unsubstituted phenylene or hydrocarbon-substituted derivatives thereof, illustrative substituents (one or more) being alkyl and alkenyl. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred radical of formula III is the 2,2-bis(4-phenylene)propane radical, which is derived from bisphenol A and in which Y is isopropylidene and $A^3$ and $A^4$ are each p-phenylene.

Included among suitable dihydroxy-substituted aromatic hydrocarbons are the 2,2,2',2'-tetrahydro-1,1'-spirobi[1H-indene]diols having formula IV:

(IV)

wherein each $R^1$ is independently selected from monovalent hydrocarbon radicals and halogen radicals; each $R^2$, $R^3$, $R^4$, and $R^5$ is independently $C_{1-6}$ alkyl; each $R^6$ and $R^7$ is independently H or $C_{1-6}$ alkyl; and each n is independently selected from positive integers having a value of from 0 to 3 inclusive. A preferred 2,2,2',2'-tetrahydro-1,1'-spirobi[1 H-indene]-diol is 2,2,2',2'-tetrahydro-3,3,3',3'-tetramethyl-1, 1'-spirobi[1H-indene]-6,6'-diol.

The substituted aromatic compounds of formula I which are employed in the present invention contain an aromatic radical $A^1$ and an activating radical Z. The $A^1$ radical is normally a di- or polyvalent $C_{6-10}$ radical, preferably monocyclic and preferably free from electron-withdrawing substituents other than Z. Unsubstituted $C_6$ aromatic radicals are especially preferred.

The Z radical is usually an electron-withdrawing group, which may be di- or polyvalent to correspond with the valence of $A^1$. Examples of divalent radicals are carbonyl, carbonylbis(arylene), sulfone, bis(arylene)sulfone, benzo-1, 2-diazine and azoxy. Thus, the moiety —$A^1$—Z—$A^1$— may be a bis(arylene)sulfone, bis(arylene)ketone, tris(arylene)bis (sulfone), tris(arylene)bis(ketone), bis(arylene)benzo-1,2-diazine or bis(arylene)azoxy radical and especially one in which $A^1$ is p-phenylene.

Also included are compounds in which —$A^1$—Z—$A^1$— is a bisimide radical, illustrated by those of the formula (V)

wherein $R^8$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula (VI)

in which Q is or a covalent bond. Most often, $R^8$ is at least one of m-phenylene, p-phenylene, 4,4'-oxybis(phenylene) and (VII)

Polyvalent Z radicals include those which, with $A^1$, form part of a fused ring system such as benzimidazole, benzoxazole, quinoxaline or benzofuran.

Also present in the substituted aromatic compound of formula I are two displaceable $X^1$ radicals which may be fluoro, chloro, bromo, or iodo. In most instances, fluoro and especially chloro atoms are preferred by reason of the relative availability and effectiveness of the compounds containing them.

Among the particularly preferred substituted aromatic compounds of formula I are bis(4-fluorophenyl)sulfone and the corresponding chloro compound; bis(4-fluorophenyl) ketone and the corresponding chloro compound; and 1,3- and 1,4-bis[N-(4-fluorophthalimido)]benzene and 4,4'-bis [N-(4-fluorophthalimido)]phenyl ether and the corresponding chloro and bromo compounds, especially at least one of 1,3- and 1,4-bis[N-(4-chlorophthalimido)]benzene.

Also present in the reaction mixture is a phase transfer catalyst, preferably one which is substantially stable at the temperatures employed; i.e., in the range of between about 125° C. and about 250° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. Said patents and application are incorporated by reference herein. The preferred phase transfer catalysts, by reason of their exceptional stability at high temperatures and their effectiveness to produce high molecular weight aromatic polyether polymers in high yield are the hexaalkylguanidinium and alpha, omega-bis(pentaalkylguanidinium)alkane salts, particularly the chloride salts.

At least one substantially water-immiscible organic solvent may also be present in the reaction mixture. Said at least one solvent may completely or at least partially dissolve reaction ingredients. Within the context of the present invention suitable solvents are those which have a boiling point of greater than the desired reaction temperature at the maximum reaction pressure and preferably greater than about 90° C. Suitable solvents also have a density which is in a ratio to the density of water in a range of between about 0.9:1 and about 1.1:1 measured at a temperature in the range of between about 20° C. and about 25° C. (wherein the density of water is 0.997 grams per cubic centimeter measured in that temperature range). Substantially water-immiscible means that the organic solvent dissolves to the extent of less than about 10 wt. % and preferably less than about 5 wt. % in water, or that water dissolves to the extent of less than about 10 wt. % and preferably less than about 5 wt. % in the organic solvent. Preferred solvents are symmetrical or unsymmetrical ethers containing at least one aromatic group such as diphenyl ether, phenetole(ethoxybenzene), and anisole(methoxybenzene). Monoalkoxybenzenes, especially anisole, are particularly preferred.

In one embodiment the method of the present invention comprises contacting with water and separating a water-containing phase from an organic phase (sometimes referred to herein as extraction with water). Contaminating species may be transferred from the organic to the aqueous phase during extraction with water. Typical species which may be transferred include alkali metal halide and other alkali metal salts, ionic catalyst species and catalyst decomposition products, and residual monomer species. Contact with water may be performed using standard liquid-liquid contacting methods, including those which employ one or more of mixer/settling tanks, in-pipe static mixers, liquid droplet coalescers, extraction columns, and liquid-liquid centrifuges.

In one embodiment prior to any purification step which involves contacting with water and separating a water-containing phase from an organic phase, a polyether-containing mixture is quenched with acid, said acid being in solid, liquid, gaseous, or solution form. Suitable acids include organic acids, particularly carboxylic acids such as acetic acid, and inorganic acids such as phosphorous acid, phosphoric acid, or hydrochloric acid, preferably anhydrous hydrochloric acid. A gaseous acid, such as anhydrous hydrochloric acid, can be bubbled into the mixture through a sparger or delivered as a solution in a convenient solvent such in the same organic solvent as used in the mixture. The quantity of acid added is preferably at least sufficient to react with the calculated amount of phenoxide end-groups that will be present for a given molecular weight of polyether product. Preferably the quantity of acid added is greater than the calculated amount and more preferably about twice the calculated amount of phenoxide end-groups that will be present for a given molecular weight of polyether product.

The acid may be added using any convenient protocol. Typically, a gaseous acid is added over time, said time being dependent upon factors known to those skilled in the art, including the volume of the mixture and the concentration of polyether product among others. The time of addition is typically less than about 60 minutes, more typically less than about 20 minutes, and still more typically less than about 10 minutes. The temperature of the mixture during acid addition may vary from about room temperature to about the boiling point of the organic solvent, preferably from about 50° C. to about 155° C., more preferably from about 60° C. to about 140° C., and still more preferably from about 90° C. to about 120° C. Following acid quenching the mixture may be taken directly to any subsequent steps or may be stirred for a convenient period, typically for a time in a range between about 30 minutes and about 60 minutes.

The quenching step typically converts surface-active species, for example phenoxide salts of alkali metal and/or catalyst cationic species, to non-surface-active phenolic groups. This quenching step also permits more efficient recovery of any polymer-bound catalyst cationic species by converting them to salts which are more easily recovered from the mixture, such as chloride salts. In the case of polyetherimide-containing mixtures quenching is also important in converting any residual carboxylate salts to carboxylic acids which can ring-close to imide during subsequent processing steps resulting in higher polymer stability. The quenching step also helps deter emulsion formation during subsequent contacting with water step through removal of surface active species.

In one embodiment the method of the present invention comprises subjecting the polyether-containing reaction mixture to at least one extraction with water following acid quenching. Water extraction may be performed using a mixer and settling tank combination. An advantage of this combination is that the required equipment is simple, requiring an impeller or other dynamic mixing device, and a tank of proper geometry.

In a preferred embodiment a mixer/settling tank contains a polyetherimide/anisole solution comprising sodium chloride and at least one catalyst, preferably a hexaalkylguanidinium chloride. The mixture is brought to a temperature in the range of between about 25° C. and about 155° C., preferably in the range of between about 60° C. and about 155° C., more preferably in the range of between about 90° C. and about 155° C., and still more preferably in the range of between about 100° C. and about 140° C. In an especially preferred embodiment the mixture is brought to a temperature in the range of between about 90° C. and about 120° C. Water is added to the tank and stirring is applied. When temperatures above the effective boiling point (at atmospheric pressure) of the anisole-water mixture are employed, then the tank is typically enclosed under pressure during any water addition and extraction step. In these cases typical pressures are in a range between about 1 psi and about 150 psi.

The formation of a brine with as high a density as possible is desired to get fast phase separation of aqueous and organic phases. Therefore, the amount of water added in a first water extraction step is typically such as to form as concentrated a solution of sodium chloride as conveniently possible. Typical phase ratios are in a range of between about 3 parts of anisole to one part water and about 7 parts of anisole to one part of water by volume. If a larger amount of water is added, then the density of the aqueous phase may not be sufficiently different from that of the anisole phase to provide rapid phase separation. If a smaller amount of water is added, then there may be a low extraction efficiency of sodium chloride and catalyst from the anisole phase necessitating more than an economically feasible number of water washes. A preferred phase ratio is in a range of between about 4.5 parts of anisole to one part water and about 5.5 parts of anisole to one part water by volume. The desired stirring rate is below the rate at which emulsification of the mixture occurs. More particularly, the stirring rate must provide sufficient contact between the phases so that adequate mass transfer occurs without too large an interfacial area being generated. Typical stirring rates are such as to provide Reynolds numbers in a range of between about 25 and about 500 and preferably in a range of between about 50 and about 100.

In a preferred embodiment the stirrer is stopped after a few minutes of stirring and the anisole/water mixture is allowed to settle. Since the water picks up a large fraction of sodium chloride, its density is generally-higher than that of the anisole phase, and typically the aqueous phase settles to the bottom. Some of the sodium chloride dissolves in the water and some remains in the anisole phase, typically as crystals. This first extraction typically achieves greater than about 70%, preferably greater than about 90%, more preferably greater than about 98%, and most preferably greater than about 99% sodium chloride removal from an anisole phase as measured by ion chromatography or ion selective electrode on the aqueous layer. The first extraction also typically removes an amount in a range between about 50% and about 95% of any ionic catalyst present. The high efficiency of the first extraction is a result of the initially high concentration of sodium chloride (for example, up to about 3 wt. % sodium chloride in an anisole phase containing about 15 wt. % polyetherimide, both weights based on the weight of the total solution) that forms a denser aqueous phase which in turns settles readily.

In a preferred embodiment the aqueous phase is removed without including any emulsified layer (hereinafter sometimes referred to as "rag layer") that may be present, and saved for catalyst, monomer species, and sodium chloride recovery by conventional means (for instance, using a coalescer). Any rag layer, if present, may be removed and transferred to a separate vessel for later addition to the next batch of polymer mixture for purification, or left together with the anisole solution for a second extraction. The organic phase left in the vessel may be subjected to a second extraction, if further purification is desired, or sent to a polymer isolation step where the solvent is completely removed from the solution.

If higher levels of purification are desired, one or more additional water extraction steps may be performed in a preferred embodiment using mixing/settling, for example in the same vessel. Because lower levels of sodium chloride and ionic catalyst remain in the anisole phase following the first water extraction, the aqueous phase from the second extraction may not settle to the bottom of the tank, and may instead be present as a top layer. To avoid emulsification, in one embodiment a ratio in a range of between about 0.5 parts of anisole to one part water and about 2 parts of anisole to one part water by volume is used and in another embodiment a ratio of about 2 parts of anisole to one part water by volume is used instead of the higher ratio used in the first extraction. By adding a higher level of water in any extraction following the first extraction, the emulsion tendency of the mixture may be diminished because there is a higher coalescence tendency of the discontinuous phase due to higher droplet collision frequency. The desired stirring rate is below the rate at which emulsification of the mixture occurs. More particularly, the stirring rate must provide sufficient contact between the phases so that adequate mass transfer occurs without too large an interfacial area being generated. Typical stirring rates are such as to provide Reynolds numbers in a range of between about 25 and about 500, and preferably in a range of between about 50 and about 100.

In addition, any extraction after a first extraction is preferably performed in a temperature range of between about 25° C. and about 80° C., and preferably in a temperature range of between about 25° C. and about 50° C., where the density difference between water and anisole phase is greater than at higher temperature. By using a lower phase ratio and a lower temperature during any second (and subsequent) extraction steps, rapid phase separation may be achieved with substantial avoidance of rag layer formation. A second water extraction process typically achieves greater than about 90%, preferably greater than about 96%, more preferably greater than about 98%, and most preferably greater than about 99% sodium chloride and ionic catalyst removal from an anisole phase (based on the weight sodium chloride and catalyst remaining after the first extraction). In an especially preferred embodiment the second extraction removes essentially 100% of sodium chloride and ionic catalyst remaining in an anisole phase, as measured by ion chromatography or ion selective electrode on the aqueous layer.

In another embodiment a second (or subsequent) water extraction step can be carried out by a process which comprises sparging steam through the anisole phase under pressure. The steam temperature has a value of less than the boiling point of anisole under the process conditions, preferably a value in a range between about 110° C. and about 150° C., and more preferably a value of about 140° C. The anisole mixture preferably has a temperature in a range between about 100° C. and about 150° C., and more preferably about 110°. The amount of steam sparged per minute is typically such as to provide a vol./vol. ratio of anisole to steam in a range between about 0.5:1 and about 10:1, more preferably in a range between about 3:1 and about 7:1, and still more preferably of about 5:1. In a typical process steam is sparged for a time in a range between about 1 minute and about 60 minutes, preferably for a time in a range between about 10 minutes and about 60 minutes, and more preferably for about 30 minutes. Steam may be vented from the container through a pressure relief valve. Any anisole that happens to be removed along with the escaping steam may be recovered using standard methods.

As the steam rises, it will typically carry upwards any residual entrained water droplets remaining from a first (or subsequent) extraction, thus further increasing the sodium recovery efficiency. As described above, an aqueous phase may typically collect at the top of an anisole phase. The anisole phase is then removed from the bottom of the vessel leaving the aqueous phase behind after which said aqueous phase may be treated in a manner as described hereinafter. More than one step comprising steam sparging of an anisole phase may be employed.

The aqueous phase from any extraction step may be removed and further processed as desired, for example by at least one step comprising recycling, waste water treatment, and at least one recovery step (for example, processing in a coalescer) for recovery of such species as catalyst and traces of organic solvent. In one embodiment two or more aqueous fractions from different extractions are combined for recovery of such species as catalyst, monomer, and any traces of organic solvent. Any small, water-insoluble particles that may remain in the anisole phase after separation from a water phase may be removed by a solid separation method, such as a filtration step, as described hereinafter.

In a preferred embodiment hexaalkylguanidinium chloride catalyst from a polyetherimide preparation may be recovered for reuse from one or more aqueous fractions by mixing with anisole and removing water by azeotropic distillation until substantially all the water is removed. The distillation may be further continued until a desired concentration of catalyst in anisole and a desired residual water level are obtained. If necessary, additional dry anisole may be added to the distillation as required. The amount of recovered catalyst in anisole is typically an amount in a range of between about 5% and about 99%, more typically in a range of between about 40% and about 98%, and still more typically in a range of between about 50% and about 90% of the original amount of catalyst added to a reaction mixture. Concentrations of residual water are typically less than about 100 ppm, and preferably less than about 50 ppm. If there are any water-insoluble particles in the catalyst-containing anisole phase after distillation, they may be removed by filtration as described hereinafter.

In another embodiment a filtration step may be included following the one or more water extraction steps in the embodiments described above. In this embodiment any residual solid particles may be removed that are insoluble in the organic phase but which were not removed completely during water extraction. This embodiment may also be preferred for polyether-containing mixtures in which the initial particle size of solids present in the organic phase may be such that filtration prior to extraction is not feasible or cost effective. The combination of one or more water extraction steps followed by a filtration step may be used to treat polyether/organic solvent mixtures, or rag layers therefrom, or a combination of polyether/organic solvent mixture and rag layer.

In a particularly preferred embodiment a polyetherimide/anisole reaction mixture comprising sodium chloride, residual monomer, and catalyst is subjected to one or more water extraction steps to remove the bulk of water-soluble species. Following water extraction, the temperature of the anisole phase is raised to a temperature between the boiling point of water and the boiling point of anisole under the prevailing pressure, preferably to at least 110° C., and more preferably to a temperature between about 120° C. and the boiling point of anisole under the process conditions (which is 155° C. at one atmosphere pressure). At said temperatures residual water generates small bubbles of steam that escape the anisole phase and evaporate. Any anisole that escapes with the steam may be recovered using conventional means. Although the invention is not limited by any theory of operation it is believed that in the process of water evaporation suspended species that may be at least partially dissolved in the residual aqueous phase may recrystallize, grow in size, and form insoluble agglomerates so that they may sediment to the bottom of the tank when stirring is stopped. For instance, the initial size of sodium chloride crystals produced during a typical polyetherimide polymerization may typically be in the range of between about 1 to about 20 $\mu$m in diameter in an anisole phase. Typically any residual crystals not dissolved and removed during water extraction recrystallize during evaporation of water to form agglomerates. Said agglomerates are larger in size than any crystallites or agglomerates present before an evaporation step. The agglomerates typically have a median particle diameter (by number) in a range between about 5 micrometers and about 80 micometers ($\mu$m), preferably greater than about 50 $\mu$m in size, and more preferably greater than about 60 $\mu$m in size. In this size range a solid separation method or step to remove the crystals, such as decantation or dry filtration using a convenient filter system, becomes feasible and cost effective. The anisole permeate from filtration may be subjected to further purification steps and/or sent to equipment for recovery of polymer from organic solvent. The filter cake itself may be treated to recover any entrained polymer and other valuable species by standard techniques, such as by extracting with anisole. Sedimentation may also be used as a solid separation method to remove crystallites or agglomerates, followed by removal of supernatant, and, if necessary, recovery of product and any other valuable species from the sediment, for example by washing. Alternatively, solid-liquid centrifugation may be used as a solid separation method to remove crystallites or agglomerates, followed by, if necessary, recovery of product and any other valuable species from the solid sediment, for example by washing.

In another embodiment a step may comprise adding a small amount of water to the polymer-containing solution in addition to or instead of employing one or more steps comprising extraction with the prescribed amounts of water. In one embodiment the polymer-containing solution is quenched with acid before addition of water. The amount of water added is typically in a range between about 0.2 vol. % and about 10 vol. %, preferably in a range between about 0.3 vol. % and about 5 vol. %, more preferably in a range between about 0.5 vol. % and about 5 vol. %, and still more preferably in a range between about 0.5 vol. % and about 1 vol. % based on polymer solution volume. The mixture is agitated. In one embodiment the temperature of the mixture may be in a range between about room temperature and about the boiling point of water under the prevailing pressure. In another embodiment the temperature is in a range between about 50° C. and about 100° C. Although the invention is not limited by any theory of operation, it is believed that the added water interacts with the hydrophilic sodium chloride crystals and forms liquid bridges that promote further agglomeration. The solid species comprising crystals containing water can then be removed using any convenient solid separation method such as decantation or a conventional filtration step as described above. Alternatively, following the addition of water the mixture may be heated to a temperature between the boiling point of water and the boiling point of the organic solvent under the prevailing pressure. For example the mixture may be heated to a temperature between the boiling point of water and the boiling point of anisole under the prevailing pressure, preferably to at least about 90° C., more preferably to at least about 110° C., and still more preferably to a temperature between about 120° C. and the boiling point of anisole under the process conditions (which is 155° C. at one atmosphere pressure). At said temperatures water generates small bubbles of steam that escape the anisole phase and evaporate. Any anisole that escapes with the steam may be recovered using conventional means. Although the invention is not limited by any theory of operation it is believed that in the process of water evaporation suspended species that may be at least partially dissolved in the residual aqueous phase may recrystallize, grow in size, and form insoluble agglomerates so that they may sediment to the bottom of the tank when stirring is stopped. The solid species comprising crystals can then be removed by any convenient solid separation method such as decantation or a conventional filtration step as described above. In one embodiment a polyetherimide-containing anisole permeate from said filtration can then be extracted one or more times with water, if desired, as described above for a second (or subsequent) water extraction. Either immediately following filtration or following any subsequent water extraction, the permeate from filtration can also be heated to a temperature between the boiling point of water and the boiling point of anisole under the prevailing pressure, preferably to at least about 110° C., and more preferably to a temperature between about 120° C. and the boiling point of anisole under the process conditions (which is 155° C. at one atmosphere pressure). Typically any residual crystals not removed during filtration (or subsequent water extraction) recrystallize during evaporation of water to form agglomerates. Said agglomerates are larger in size than crystallites or agglomerates present before an evaporation step, and can be removed by a solid separation method or step, such as by filtration as described hereinabove or by sedimentation, followed by removal of supernatant, and, if necessary, recovery of product and any other valuable species from the sediment, for example by washing. Any resulting filter cake and anisole permeate can be treated to recover polyetherimide and catalyst as described. Alternatively, solid-liquid centrifugation may be used as a solid separation method to remove crystallites or agglomerates, followed by, if necessary, recovery of product and any other valuable species from the solid sediment, for example by washing.

In another embodiment a static mixer can be used in conjunction with or as an alternate approach to a dynamic mixer/settling tank. The advantages of static mixers are that a milder degree of mixing is often possible by minimizing shear forces and avoiding smaller droplet formation and possible emulsification. Various process configurations can be employed when at least one step in the process uses a static mixer. For example, a static mixer can be used for contacting organic phase with water in a first extraction with water, or in all extractions with water, or in one or more subsequent extractions with water following a first extraction that employs a dynamic mixer/settling tank combination.

The usefulness of a static mixer may be greater for performing a second or subsequent extraction following a first water extraction, since often with second and/or subsequent extractions the emulsification tendencies may be greater. Employing a static mixer for at least one extraction step may be particularly useful when a mixture produces a larger than usual rag layer or emulsifies abnormally, or when the purification process comprises adding rag layer either to a subsequent extraction after a first extraction or to a next mixture, and the volume of rag layer continues to increase as the number of batches increases. Since rag layers typically represent about 10% or less of any aqueous phase volume (or typically less than about 2% of the organic phase), the use of additional water injected into any rag layer as it is removed from a holding tank, for example, for pumping through a static mixer is not a serious penalty to the process operation. The two phases can then be separated and recovered by such means as in a coalescer filter medium. A static mixer/coalescer combination can also be used in parallel to the hereinabove described processes of one or more water extraction steps (including the steam sparging option), optionally with a subsequent filtration step. In one embodiment a dynamic mixer/settling tank combination may separate the bulk of the two phases while a static mixer/coalescer reclaim the polymer solution from any rag layer formed. In another embodiment a dynamic mixer/settling tank combination may separate the bulk of the two phases and the organic phase (optionally with rag layer) is then passed at least once through a recycle loop comprising a static mixer with water injection at a level in a range of between about 0.5:1 organic:water and about 2:1 organic:water. The treated mixture then returns to a tank for settling or other treatment as described hereinabove. An advantage of such processes is that a static mixer can be used to perform the mixing in a transfer pipe in a matter of seconds, rather than minutes as in a mixer tank, and a liquid-liquid coalescer filter can be used in parallel with or instead of a settling tank to perform the separation of organic from water.

In a preferred embodiment a polyetherimide-containing anisole solution may be pumped out of a holding tank to a static mixer, where it may be combined with a stream of water in a predetermined ratio and put through a static mixer. The amount of water added may be for example in a range between about 3:1 and about 7:1, and preferably about 5:1 anisole:water volume/volume ratio for a first water extraction step or about 2:1 or less anisole:water volume/volume ratio if the static mixer is employed for any extraction following a first water extraction step. The speed of pumping is determined by the desired Reynolds number in the static mixer. Reynolds numbers less than about 500, preferably in a range between about 0.1 and about 500, are preferred and will typically result in mild interphase contact in a laminar flow regime. In between Reynolds numbers of about 500 and about 2000 either laminar or turbulent flow may be obtained. More vigorous contacting will be obtained in turbulent flow above 2000 Reynolds Number. By adjusting the length of the static mixer the contact time between the two phases can be controlled. The contact time is typically on the order of seconds. Because of the action of the static mixer resembles end-over-end or side-by-side motion rather than a shearing motion as in a stirrer, emulsification is inhibited.

In a preferred embodiment contact between anisole phase and water phase in a static mixer is preferably performed at temperatures in a range between about 25° C. and about 80° C., and more preferably at temperatures in a range between about 25° C. and about 50° C., where the density differences between water and polyetherimide-containing solutions are the greatest. The mixed system may then be sent directly to a coalescer, particularly if the time for phase separation in a settling tank is longer than desired. A coalescer may be operated at a temperature similar to or different from that of the mixture to be separated. In practical terms a coalescer may be operated at a temperature in a range between from as low as the viscosity of the mixture allows (which is a function of factors such as concentration of polymer) to just below the boiling point of anisole at the prevailing pressure. In one embodiment a coalescer is operated at as high a temperature as possible, for example, at a temperature at just below the boiling point of anisole at the prevailing pressure, and preferably at a temperature in a range of between about 90° C. and just below the boiling point of anisole at the prevailing pressure, in order to reduce viscosity, and an anisole-to-water ratio of less than 1:1, for instance, since coalescers are typically only effective for oil-in-water emulsions. The use of a coalescer at about 90° C. or higher is often more compatible in a configuration after a first extraction, where the liquid temperature is also preferably in the range of between about 90° C. and about 120° C. A prefilter may be required to remove solid particles, for example of residual monomer, prior to using a coalescer. Alternatively, a settling tank can be used instead of a coalescer. In the settling tank, the aqueous phase is continuously decanted at the top, the organic phase is continuously sent to polymer isolation where the anisole may be evaporated from the polymer.

In another embodiment the method of the present invention comprises initial treatment of a polyether-containing mixture by at least one non-aqueous or dry filtration step, in which contaminating species are removed as solid particles or adsorbed species in the absence of water. Typical species which may be removed by dry filtration include alkali metal halide, ionic catalyst species and residual monomer salts. Dry filtration may be performed using standard filtration methods, including those which employ one or more steps of mechanical filtration of solid particles, separation using liquid-solid cyclone separators, ion-exchange adsorption (for example, to recover catalyst), or vacuum conveyor belt separation.

In a preferred embodiment polyetherimide-containing anisole mixtures are treated by filtration to remove sodium chloride and bisphenol A monomer species as solid particles from an anisole phase without initially adding water. Other insoluble species will also be removed from an anisole phase. Following filtration, catalyst species and other non-filterable, water-soluble species may be separated and recovered via aqueous methods such as those employing a dynamic or static mixer or any of the aqueous configurations previously discussed. Acid quenching is postponed until after filtration so that bisphenol A salts can be removed by filtration; otherwise, bisphenol A formed during quenching may become soluble in the organic phase and may not be efficiently removed by solids filtration. The permeate from the filtration step is typically a clean solution of polymer and catalyst in anisole. The stream that is rejected by the filter is typically a concentrated slurry of sodium chloride, residual monomer species, and some catalyst in anisole. The primary filter may be at least one of either a dead-end filter or a cross-flow filter. If a dead-end filter is used, a back-washing step is required to remove the solids from the filter. Since flux through a dead-end filter is indirectly proportional to viscosity, decreasing the solution viscosity will typically increase the flux by a proportionate factor. The viscosity is largely determined by temperature and polymer concentration. Therefore, increasing the temperature or decreasing the polymer concentration may typically result in increased flux through a filter. In a preferred embodiment a polyetherimide solution in anisole at a concentration in a range of between about 5 wt. % and about 25 wt. %, preferably in a range of between about 10 wt. % and about 15 wt. %, may be conveniently filtered at a temperature up to about the boiling point of anisole, and preferably at a temperature in a range of between about 90° C. and about 120° C.

If a cross-flow filter is used, nearly continuous operation is possible but at least one secondary filter is typically required to minimize product loss. Process time and costs will determine which filtration method is best. If needed, the secondary filter can concentrate the slurry to a cake. The secondary filter may be a dead-end filter (such as a candle filter or a belt press) or a liquid cyclone. A liquid cyclone can perform the separation because the concentration of particles that occurs during cross-flow filtration induces solid particles to agglomerate and the inertial forces that promote separation in a liquid cyclone are often more effective for separation of larger agglomerates.

The permeate stream (from both the primary and, if necessary, the secondary filters) that is particle-free can be quenched with acid and sent for catalyst recovery. Because catalyst is typically more soluble in water than in anisole, this stream can be processed with any of the aqueous methods described above. Similarly, catalyst can be processed via the dry method of ion exchange described hereinafter. Again, multiple combinations of aqueous and dry purification configurations are possible, depending on the relative process conditions and the desired level of purification.

In still another embodiment the method of the invention comprises at least one dry filtration step in the presence of a solid medium that may adsorb or absorb soluble species from a polyether-containing mixture. Insoluble species such as an alkali metal halide may be removed by simple physical filtration in the same process. The mechanism of adherence to a solid medium is not important provided that the medium serves to remove selected species in one or more filtration steps while passing essentially all polyether and any other species not selected. The medium may be contacted with the mixture either by addition of all or a portion of the medium to the mixture followed by stirring, typically at a temperature in a range of between about 25° C. and about 105° C., and more preferably in a range of between about 60° C. and about 105° C. Less preferably, the heated mixture can be filtered through all or a portion of medium not previously contacted with the mixture. Suitable media include, but are not limited to, alumina, silica, diatomaceous earth, fuller's earth, commercial filter agents such as CELITE, and other media typically employed in adsorption chromatography. In a preferred embodiment a polyetherimide mixture in anisole may be contacted with an appropriate medium to adsorb essentially all or a portion of soluble species (other than polyetherimide) such as ionic catalyst species, preferably hexaethylguanidinium chloride. A preferred medium is silica gel. The treated mixture can then be filtered one or more times to remove essentially all or a portion of insoluble sodium chloride and adsorbed catalyst species on the medium. Following filtration, catalyst species may be recovered from the solid medium using methods known in the art, and any non-polyether soluble species, if still present in the filtrate, may be separated and recovered, for example by further filtration steps or by aqueous methods such as those employing a dynamic or static mixer or any of the aqueous configurations previously discussed.

In still another embodiment the method of the present invention comprises the steps of at least one dry filtration step followed by at least one ion exchange step for catalyst recovery. The dry filtration step may be accomplished by any combination of filtration methods described hereinabove. For the second step, ion exchange on a resin bed can be used after filtration to reclaim cationic catalyst remaining in the organic phase. Following ion exchange, the process solution may be sent for further purification and/or to an isolation step for polyether recovery by standard methods.

purification process comprising any combination of at least one dry filtration step followed by at least one ion exchange step may be employed. In one embodiment the polyether mixture is not quenched with acid before the at least one dry filtration step and the at least one ion exchange step. In this case the mixture following at least one filtration step may be contacted at least once with an ion exchange resin in the sodium form to remove ionic catalyst and release sodium chloride. In an alternative embodiment an unquenched mixture is contacted at least once with ion exchange resin in the hydrogen form and the resin itself serves wholly or at least partially as an acid quencher for the mixture, adsorbing ionic catalyst in the process. In another embodiment the mixture is quenched with acid after at least one dry filtration step. In this case the mixture following at least one filtration step may be contacted at least once with an ion exchange resin in the hydrogen form to remove ionic catalyst and release hydrogen chloride. In a preferred embodiment a polyetherimide mixture containing hexaalkylguanidinium chloride catalyst in anisole, after at least one filtration step, is contacted at least once with an ion exchange resin in the sodium form.

packed column of ion exchange resin can be used to exchange ionic catalyst for recovery. The identity of the ion exchange resin is not particularly critical. AMBERLYST 36 or AMBERLYST 15 resins available from Rohm and Haas Co. can be used for this purpose. In a preferred embodiment a polyetherimide-containing anisole mixture is passed through a resin bed operated at a temperature such that the pressure drop across the resin bed allows a convenient flow rate. In one embodiment temperatures below about 90° C. are preferred. Depending on the mode of operation, the resin column will adsorb the catalyst cation and release sodium chloride or hydrochloric acid.

The ion exchange process may be performed in a batch, semi-continuous, or continuous mode. In a preferred embodiment a column saturated with catalyst cation is regenerated off-line with hydrochloride acid and the catalyst chloride salt is recovered from the aqueous phase for reuse. While a saturated column is being regenerated, at least one fresh column may be in use for recovering catalyst cation from further process solution.

Following any of the purification procedures illustrated hereinabove, a polyether-containing organic solution may be sent to a polymer isolation step where the polyether may be isolated free of organic solvent by standard methods, such as by anti-solvent precipitation, filtration, and drying, or by devolatilization in an appropriate extruder with recovery and recycling of the organic solvent. In a preferred embodiment a polyetherimide is isolated from an anisole solution and the anisole is recovered and recycled for further use. The isolated polyetherimide preferably contains as low a sodium level as possible, preferably less than about 100 ppm sodium, more preferably less than about 50 ppm sodium, still more preferably less than about 25 ppm sodium, yet still more preferably less than about 10 ppm sodium, and yet still more preferably less than about 7 ppm. A preferred polyetherimide is that obtained by reaction of a bisphenol A moiety, particularly bisphenol A disodium salt, with at least one of 1,4- and 1,3-bis[N-(4-chlorophthalimido)]benzene.

Described hereinabove are several modular configurations of procedures that will achieve the required level of polyether purification. These represent illustrative examples of the invention and many other process combinations are also possible. Although the preferred embodiments of the invention concern methods for purification of a polyetherimide in an anisole solution, it is to be understood that the invention discloses methods which are suitable for the purification of any polyether made by a halide displacement polymerization method in a water-immiscible solvent with a density ratio to water in the range of between about 0.9:1 and about 1.1:1 measured at a temperature in the range of between about 20° C. and about 25° C.

Embodiments of the invention are illustrated by the following non-limiting examples. The terms "extraction" and "wash" are used interchangeably.

EXAMPLE 1

A polyetherimide was prepared in anisole through the reaction of bisphenol A disodium salt and 1,3-bis[N-(4-chlorophthalimido)]benzene in the presence of hexaethylguanidinium chloride catalyst (HEGCl; 3.5 mole % based on moles monomer unit). Several 10 milliliter (ml) vial samples containing 15 wt. % polyetherimide in anisole were injected with various amounts of a stock anisole solution containing dissolved hydrochloric acid (gas) at a concentration of 13.3 grams (g) of hydrochloric acid per 900 ml of anisole. The vials were heated to 90° C. or 120° C. in an oil bath for 30 minutes. Washing to recover HEGCl catalyst was performed by injecting 2 ml of water into each of the vials. The vials were then shaken for 2 minutes and returned to the constant temperature oil bath for the two phases to separate. After 30 minutes in the oil bath, each vial was removed from the bath and the organic phase was analyzed for residual HEGCl catalyst.

Figure 1:
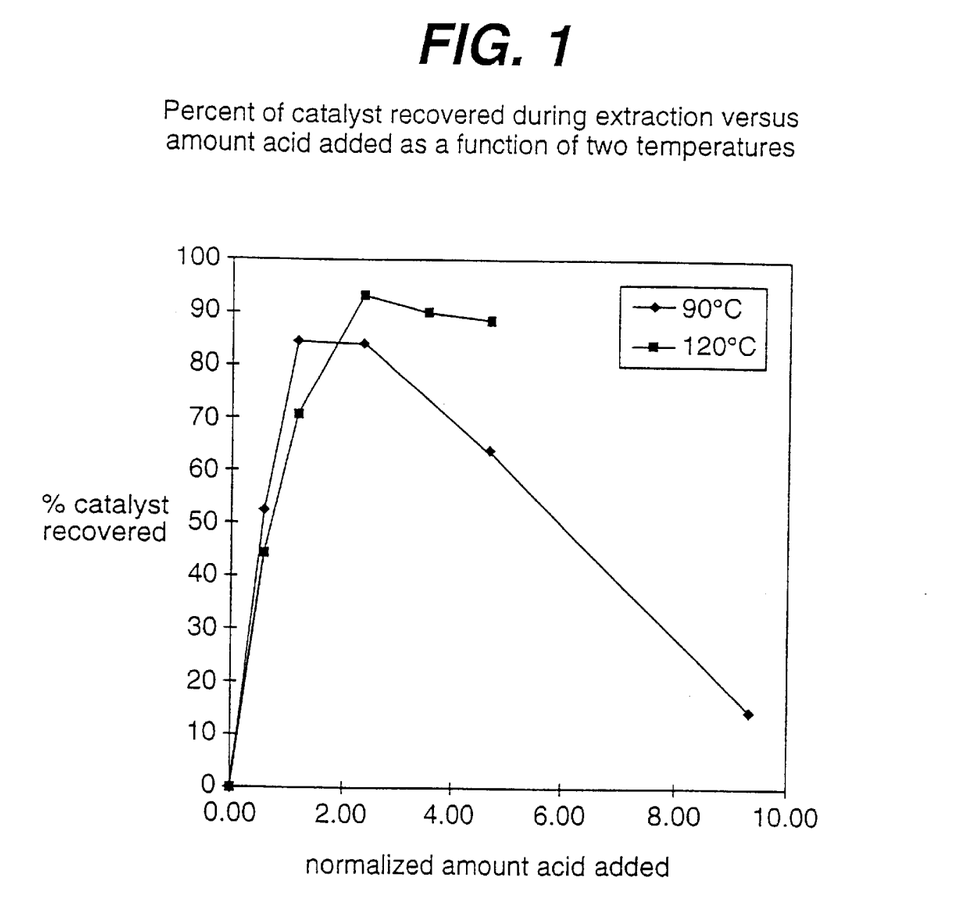
FIG. 1 shows the relationship between amount of acid added to a polyether/organic solvent reaction mixture and the efficiency of extraction of ionic catalyst species at given temperatures.

FIG. 1 shows the relationship between amount of added acid and extraction efficiency. The acid amount is normalized to the theoretical amount for quenching 1000 ppm phenolic OH end-groups relative to the weight of polymer. As seen in the figure, no acid quench results in emulsion formation, and excessive acid addition may lead to less efficient extraction.

EXAMPLE 2

Multiple washes were carried out on a 15 wt. % polyetherimide in anisole reaction mixture (as described in Example 1). The wash conditions in Table 1 were used. Results of extracting the polyetherimide solution are shown in Table 2

TABLE 1

| Wash 1 | Wash 2 | Wash 3 |
| --- | --- | --- |
| 5:1 anisole:water ratio 120° C. end-over-end mixing for 2 minutes, or 2 minute mixing with a flat-blade impeller 30-minute settling time | 2:1 anisole:water ratio 25° C. end-over-end mixing for 2 minutes, or 2 minute mixing with a flat-blade impeller 30-minute settling time | 2:1 anisole:water ratio 25° C. end-over-end mixing for 2 minutes, or 2 minute mixing with a flat-blade impeller 30-minute settling time |

TABLE 2

| Performance Parameter | Result |
| --- | --- |
| HEGCl recovery | 99.8% |
| Residual sodium in polymer | 168 ppm |
| % sodium removal | 99.79% |
| % residual BPA removal | 71.5% |

EXAMPLES 3–4

Tests were performed on purified polyetherimide (as in Example 1) dissolved in anisole (15 wt. % polyetherimide) and spiked with 3% (by weight based on total solution) sodium chloride crystals of the desired particle size distribution. Two cases were considered:one in the absence of HEGCl polymerization catalyst (Example 3) and the other in the presence of added catalyst (3.5 mole % based on moles monomer unit; Example 4). The wash conditions in Table 3 were used for each example. Results of extracting the polyetherimide solution are shown in Table 4.

TABLE 3

| Wash 1 | Wash 2 |
| --- | --- |
| 5:1 anisole:water ratio 80–90° C. Mixing at 200 rpm for 10 minutes 30-minute settling time at 70–80° C. | 5:1 anisole:water ratio 80° C. Mixing at 200 rpm for 10 minutes 30-minute settling time at 70–80° C. |

TABLE 4

| Example number | Presence of added HEGCl catalyst | Cumulative Na Recovered Aqueous Phase |
| --- | --- | --- |
| 3 | No | 67.2% |
| 4 | Yes | 98.7% |

Figure 2:
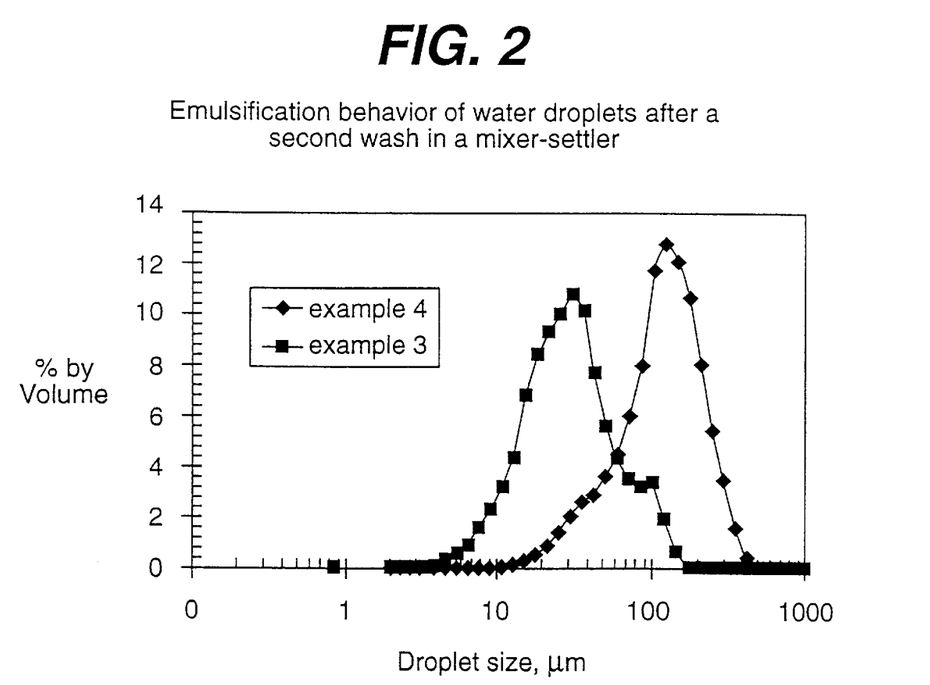
FIG. 2 shows the comparison of droplet size distribution of residual water remaining in an organic phase after a second wash for two examples, one of which contained ionic catalyst and the other of which did not.

As seen in Table 4, the presence of a polymerization catalyst may be important in determining the separation efficiency of aqueous and organic phase (that is, whether water may be retained with the organic phase through emulsification). FIG. 2 shows the comparison of droplet size distribution of residual water remaining in the anisole phase after a second wash for the two examples. Droplet size distribution was determined using a laser in-situ particle size analyzer. Example 4 retained water droplets that are larger with a median droplet diameter (by volume) of greater than about 140 $\mu$m. In contrast, Example 3 did not contain any polymerization catalyst and emulsified to a much larger extent. The retained water droplets of Example 3 were of smaller size that formed a more stable emulsion. Both cases demonstrate that retained water will reduce the efficiency at which sodium is removed from the organic phase.

EXAMPLE 5

Tests were performed on a polyetherimide/anisole reaction mixture as described in Example 1. The solutions were washed at a temperature in a range of between about 80° C. and about 120° C. with water in a 5:1 anisole:water ratio. The washed solutions were heated to a temperature in a range of between about 140° C. and about 155° C. to evaporate the water. The polymer solution was then filtered using either a 0.5 micron polymeric filter or a 2-micron sintered metal filters. The results are shown in Table 5.

TABLE 5

| Performance Parameter | Result |
|---|---|
| HEGCl recovery | 93.4% |
| Residual sodium in polymer | 25 ppm |
| % sodium removal | 99.97% |
| Residual BPA in polymer | 57 ppm |

The improved value for sodium chloride removal in Example 5 versus the value obtained by the purification protocol in Example 4 is a result of the added evaporation step and filtration step.

Figure 3:
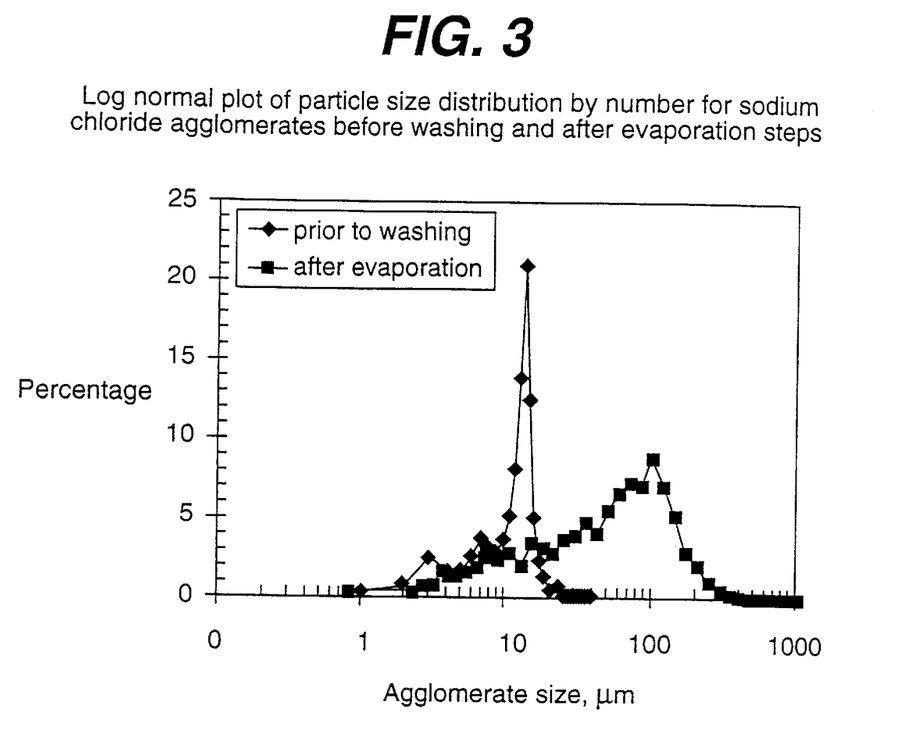
FIG. 3 shows a log normal plot of particle size distribution (PSD) by number for sodium chloride agglomerates before washing and after evaporation steps for a polyether/organic solvent reaction mixture.

The quantitative effect of evaporation is shown in FIG. 3. Agglomerate size distribution was determined using a laser in-situ particle size analyzer. The initial sodium chloride crystallites formed during polymerization had a median particle diameter (by number) of about 17 $\mu$m in the polyetherimide/anisole reaction mixture after polymerization. Upon washing and evaporation, the crystals agglomerated into units that were about 60 $\mu$m in median particle diameter, which settled under gravity in the absence of stirring. These crystals were then amenable to filtration with a commercial filtration system and levels of sodium chloride removal greater than 99.9% were achieved.

EXAMPLE 6

Tests simulating a second wash using a laboratory-scale static mixer were qualitatively carried out on a 15 wt. % solution of purified polyetherimide (as in Example 1) dissolved in anisole and spiked with 1.5 mole % (based on moles monomer unit) HEGCl catalyst. Transparent tubing was used to observe the flow. The degree of mixing was controlled by adjusting the flow rate to a Reynolds number in a range of between about 30 and about 50 in the tube. The solution was pumped via a peristaltic pump at a temperature in a range between about 70° C. and about 80° C. through a $\frac{3}{8}$ inch diameter static mixer (24 elements). Flow rate of anisole solution was 400 cc/min; flow rate of water was 85 cc/min. The phases were collected in a beaker at 80° C. Eighty two percent of water phase was recovered and about 60–70% of HEGCl was recovered in triplicate tests.

EXAMPLE 7

The use of a coalescer was tested to reclaim polymer in a simulated rag layer from a first wash of a reaction mixture containing polyetherimide. Thus, a 15 wt. % solution of polyetherimide (as described in Example 1) was prepared in anisole and spiked with sodium chloride of the desired particle size distribution (3% by weight based on total solution). Reclaiming of polymer by concentrating it from aqueous continuous phases was achieved in two passes using a 1:4 anisole:water ratio at 80° C. The separated water phase was clear and free of residual polymer. Close to 99% polymer recovery was obtained while virtually all the water entrained in the organic phase was rejected.

EXAMPLE 8

Cross-flow filtration tests were conducted on a model solution of 15 wt. % polyetherimide (as in Example 1) dissolved in anisole and spiked with 2.3 wt. % (based on total solution) sodium chloride crystals of the desired particle size distribution. The solution was filtered through two ceramic membranes with 0.2 micron and 0.8 micron pore sizes. With the 0.2 micron filter, a flux of 0.002 gallons per minute per square foot (gpm/ft$^2$) was obtained at 100° C. The pressure drop across the filter was 15 pounds per square inch (psi). The 0.8 micron filter did not produce a permeate. The permeate sample from the 0.2 micron filter was analyzed for sodium. The sodium concentration was 21 ppm in the polymer.

EXAMPLE 9

Dead-end filtration tests were conducted using 2 micron sintered stainless steel filters. A model solution of polyetherimide (as in Example 1) dissolved in anisole and spiked with 3 wt. % (based on total solution) sodium chloride crystals of the desired particle size distribution was filtered. The pressure was adjusted to maintain a flux of about 0.1 gpM/ft$^2$. The maximum pressure reached was 45 psi at 32° C. Tests were also conducted under a constant pressure of 30 psi at 24° C. The flux was in a range of between about 0.14 gpm/ft$^2$ and about 0.08 gpm/ft$^2$. Permeate samples contained on average about 26 ppm Na with values as low as about 5 ppm in the polymer.

EXAMPLE 10

Adsorption isotherm tests were conducted to measure the adsorption capabilities of AMBERLYST 15 ion exchange resins for HEGCl catalyst recovery. Resins were converted to the sodium form by washing with 1M sodium hydroxide followed by water and then methanol. The resins were then dried in air. Known amounts of ion exchange resin were placed in 20 ml vials and contacted with model solutions of 10 wt. % purified polyetherimide (as in Example 1) dissolved in anisole or polyetherimide/anisole reaction mixtures as described in Example 1. Vials were shaken for 2 hours and then tested for catalyst concentration. Table 6 shows the equilibrium concentrations of catalyst showing a high recovery efficiency. AMBERLYST resins were capable of reducing the initial catalyst concentrations in the anisole solutions from about 1280 ppm down to about 7 ppm at equilibrium for the case of model solutions and from about 89 ppm HEG down to about 42 ppm HEG at equilibrium for the case of the actual reaction mixtures.

TABLE 6

| Wt. ion exchange resin (g) | Model Solution, ppm catalyst remaining | Polyetherimide reaction mixture, ppm catalyst remaining |
|---|---|---|
| 0 | 1280 | 890 |
| 0.1 | 676 | 581 |
| 0.25 | 53 | |
| 0.5 | 17 | 234 |
| 2.0 | 7 | 42 |

What is claimed is:

1. A method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:

(a) quenching the reaction mixture with acid;
(b) extracting the organic phase at least once with water, followed by:
(c) at least one step of separating solid species by a solid separation method.

2. The method of claim 1 wherein the aromatic polyether is selected from the group consisting of polyethersulfones, polyetherketones, polyetheretherketones, and polyetherimides.

3. The method of claim 2 wherein the aromatic polyether is an aromatic polyetherimide.

4. The method of claim 3 wherein the aromatic polyetherimide comprises the reaction product of a bisphenol A moiety with 1,3-bis[N-(4-chlorophthalimido)]benzene.

5. The method of claim 1 wherein the catalyst is at least one member selected from the group consisting of hexaalkylguanidinium salts and alpha,omega-bis(pentaalkylguanidinium)alkane salts.

6. The method of claim 1 wherein the acid is at least one organic or inorganic acid selected from the group consisting of carboxylic acids, acetic acid, phosphorous acid, phosphoric acid, and hydrochloric acid, and mixtures thereof.

7. The method of claim 1 wherein at least one water extraction is performed using a mixer/settling tank, or a static mixer, or by sparging with steam, or a combination thereof.

8. The method of claim 7 wherein at least one water extraction is performed using a static mixer/coalescer combination.

9. The method of claim 1 wherein the organic solvent is at least one member selected from the group consisting of diphenyl ether, phenetole, and anisole.

10. The method of claim 9 wherein the organic solvent is anisole.

11. The method of claim 10 wherein a first water extraction is performed using phase ratio of anisole to water in a range of between about 3:1 and about 7:1 by volume.

12. The method of claim 11 wherein the phase ratio of anisole to water is in a range of between about 4.5:1 and about 5.5:1 by volume.

13. The method of claim 11 wherein a first water extraction is performed at a temperature in a range of between about 60° C. and about 155° C.

14. The method of claim 11 wherein the water phase is more dense than the anisole phase following mixing.

15. The method of claim 10 wherein any water extraction following a first water extraction is performed using phase ratio of anisole to water in a range of between about 0.5:1 and about 2:1 by volume.

16. The method of claim 15 wherein any water extraction following a first water extraction is performed at a temperature in a range of between about 25° C. and about 80° C.

17. The method of claim 16 wherein the water phase is less dense than the anisole phase following mixing.

18. The method of claim 1 wherein the water phase from any extraction is treated to recover catalyst.

19. The method of claim 18 wherein the catalyst is at least one member selected from the group consisting of hexaalkylguanidinium salts and alpha,omega-bis(pentaalkylguanidinium)alkane salts.

20. The method of claim 1 wherein the solid separation method is a filtration step, a sedimentation step, a decantation step, or a solid-liquid centrifugation step.

21. The method of claim 1 wherein the temperature of the organic phase is raised to a temperature between the boiling point of water and the boiling point of the organic phase under the prevailing pressure before at least one solid separation step.

22. The method of claim 1 wherein particles in the mixture have a median particle diameter (by number) of greater than about 50 $\mu$m.

23. The method of claim 10 further comprising at least one solid separation step following any water extraction step.

24. The method of claim 23 wherein at least one solid separation step is a filtration step, a sedimentation step, a decantation step, or a solid-liquid centrifugation step.

25. The method of claim 23 wherein the anisole phase is heated to a temperature of at least about 110° C. following any water extraction step and before at least one solid separation step.

26. The method of claim 23 wherein particles in the mixture have a median particle diameter (by number) of greater than about 50 $\mu$m.

27. A method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:

(a) quenching the reaction mixture with acid; and
(b) adding water to the mixture to effect agglomeration of solid species comprising alkali metal halide; and
(c) separating the solid species by a solid separation method.

28. The method of claim 27 wherein the aromatic polyether is selected from the group consisting of polyethersulfones, polyetherketones, polyetheretherketones, and polyetherimides.

29. The method of claim 28 wherein the aromatic polyether is an aromatic polyetherimide.

30. The method of claim 29 wherein the aromatic polyetherimide comprises the reaction product of a bisphenol A moiety with 1,3-bis[N-(4-chlorophthalimido)]benzene.

31. The method of claim 27 wherein the catalyst is at least one member selected from the group consisting of hexaalkylguanidinium salts and alpha,omega-bis(pentaalkylguanidinium)alkane salts.

32. The method of claim 27 wherein the acid is at least one organic or inorganic acid selected from the group consisting of carboxylic acids, acetic acid, phosphorous acid, phosphoric acid, and hydrochloric acid, and mixtures thereof.

33. The method of claim 27 wherein at least one solid separation step is a filtration step, a sedimentation step, a decantation step, or a solid-liquid centrifugation step.

34. A method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:

(a) subjecting the mixture to at least one solid separation step;
(b) then quenching the mixture with acid; and
(c) extracting the organic phase at least once with water.

35. The method of claim 34 wherein the aromatic polyether is selected from the group consisting of polyethersulfones, polyetherketones, polyetheretherketones, and polyetherimides.

36. The method of claim 35 wherein the aromatic polyether is an aromatic polyetherimide.

37. The method of claim 36 wherein the aromatic polyetherimide comprises the reaction product of a bisphenol A moiety with 1,3-bis[N-(4-chlorophthalimido)]benzene.

38. The method of claim 34 wherein the catalyst is at least one member selected from the group consisting of hexaalkylguanidinium salts and alpha,omega-bis(pentaalkylguanidinium)alkane salts.

39. The method of claim 34 wherein the acid is at least one organic or inorganic acid selected from the group consisting of carboxylic acids, acetic acid, phosphorous acid, phosphoric acid, and hydrochloric acid, and mixtures thereof.

40. The method of claim 34 wherein at least one solid separation step is performed using at least one of a dead-end filter, a cross-flow filter, a liquid-solid cyclone separator, or a vacuum conveyor belt separator.

41. The method of claim 34 wherein the organic solvent is at least one member selected from the group consisting of diphenyl ether, phenetole, and anisole.

42. The method of claim 41 wherein the organic solvent is anisole.

43. The method of claim 34 wherein the temperature of the organic phase is raised to a temperature between the boiling point of water and the boiling point of the organic phase under the prevailing pressure before at least one solid separation step.

44. The method of claim 43 wherein particles in the mixture have a median particle diameter (by number) of greater than about 50 µm.

45. The method of claim 42 wherein the anisole phase is heated to a temperature of at least about 110° C. before at least one solid separation step.

46. The method of claim 45 wherein particles in the mixture have a median particle diameter (by number) of greater than about 50 µm.

47. The method of claim 34 wherein the water phase from any extraction is treated to recover catalyst.

48. The method of claim 47 wherein the catalyst is at least one member selected from the group consisting of hexaalkylguanidinium salts and alpha,omega-bis(pentaalkylguanidinium)alkane salts.

49. A method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising: at least one filtration step, and at least one ion exchange step.

50. The method of claim 49 wherein the aromatic polyether is selected from the group consisting of polyethersulfones, polyetherketones, polyetheretherketones and polyetherimides.

51. The method of claim 50 wherein the aromatic polyether is an aromatic polyetherimide.

52. The method of claim 51 wherein the aromatic polyetherimide comprises the reaction product of a bisphenol A moiety with 1,3-bis[N-(4-chlorophthalimido)]benzene.

53. The method of claim 49 wherein the ion exchange resin is treated to recover catalyst.

54. The method of claim 53 wherein the catalyst is at least one member selected from the group consisting of hexaalkylguanidinium salts and alpha,omega-bis(pentaalkylguanidinium)alkane salts.

55. The method of claim 49 wherein the organic solvent is at least one member selected from the group consisting of diphenyl ether, phenetole, and anisole.

56. The method of claim 55 wherein the organic solvent is anisole.

57. The method of claim 49 further comprising at least one water extraction step.

58. The method of claim 57 wherein the reaction mixture is quenched with acid before at least one water extraction step.

59. A method for purifying a mixture comprising (i) an aromatic polyetherimide reaction product made by reaction of bisphenol A disodium salt and at least one of 1,4- and 1,3-bis(N-(4-chlorophthalimido))benzene, (ii) a hexaalkylguanidinium chloride catalyst, (iii) sodium chloride, and (iv) anisole, comprising the steps of:

(a) quenching the mixture with acid;

(b) extracting the organic phase at least once with water, followed by:

(c) raising the temperature of the anisole phase to a temperature between the boiling point of water and the boiling point of the anisole phase under the prevailing pressure, followed by:

(d) at least one step of separating solid species by a solid separation method.

60. The method of claim 59 wherein the acid is at least one organic or inorganic acid selected from the group consisting of carboxylic acids, acetic acid, phosphorous acid, phosphoric acid, and hydrochloric acid, and mixtures thereof.

61. The method of claim 59 wherein the water phase from any extraction is treated to recover hexaalkylguanidinium chloride catalyst.

62. The method of claim 61 wherein the water phase separated from any extraction is mixed with anisole and azeotropically distilled to remove water.

63. The polyetherimide product purified by the method of claim 59 containing less than about 100 ppm sodium.

64. A method for purifying a mixture comprising (i) an aromatic polyetherimide reaction product made by reaction of bisphenol A disodium salt and at least one of 1,4- and 1,3-bis(N-(4-chlorophthalimido))benzene, (ii) a hexaalkylguanidinium chloride catalyst, (iii) sodium chloride, and (iv) anisole, comprising the steps of:

(a) filtering the mixture;

(b) then quenching the reaction mixture with acid; and (c) extracting the organic phase at least once with water.

65. The method of claim 64 wherein the acid is at least one organic or inorganic acid selected from the group consisting of carboxylic acids, acetic acid, phosphorous acid, phosphoric acid, and hydrochloric acid, and mixtures thereof.

66. The method of claim 65 wherein the water phase from any extraction is treated to recover hexaalkylguanidinium chloride catalyst.

67. A The method of claim 66 wherein the water phase separated from any extraction is mixed with anisole and azeotropically distilled to remove water.

68. The polyetherimide product purified by the method of claim 64 containing less than about 100 ppm sodium.

69. A method for purifying a mixture comprising (i) an aromatic polyetherimide reaction product made by reaction of bisphenol A disodium salt and at least one of 1,4- and 1,3-bis[N-(4-chlorophthalimido)]benzene, (ii) a hexaalkylguanidinium chloride catalyst, (iii) sodium chloride, and (iv) anisole, comprising: at least one filtration step, and at least one ion exchange step.

70. The method of claim 69 wherein the ion exchange resin is treated to recover catalyst.

71. The polyetherimide product purified by the method of claim 69 containing less than about 100 ppm sodium.

72. The method of claim 59 wherein the solid separation method is a filtration step, a sedimentation step, a decantation step, or a solid-liquid centrifugation step.

73. A method for purifying a mixture comprising (i) an aromatic polyether reaction product made by a halide displacement polymerization process, (ii) a catalyst, (iii) an alkali metal halide, and (iv) a substantially water-immiscible organic solvent with a density ratio to water in the range of between about 0.9:1 and about 1.1:1 measured at a temperature in the range of between about 20° C. and about 25° C., comprising the steps of:
  (a) providing 0.2–10 volume % water to the reaction mixture;
  (b) heating to a temperature between the boiling point of water and the boiling point of the organic solvent under the prevailing pressure, wherein a portion of alkali metal halide is in a form that can be separated by a solid separation method following the application of heat; and
  (c) separating the solid species by at least one solid separation method.

74. The method of claim 73 wherein at least one solid separation step is a filtration step, a sedimentation step, a decantation step, or a solid-liquid centrifugation step.

75. The method of claim 73 wherein the aromatic polyether is selected from the group consisting of polyethersulfones, polyetherketones, polyetheretherketones, and polyetherimides.

76. The method of claim 75 wherein the aromatic polyether is an aromatic polyetherimide.

77. The method of claim 76 wherein the aromatic polyetherimide comprises the reaction product of a bisphenol A moiety with 1,3-bis[N-(4-chlorophthalimido)]benzene.

78. The method of claim 73 wherein the catalyst is at least one member selected from the group consisting of hexaalkylguanidinium salts and alpha,omega-bis(pentaalkylguanidinium)alkane salts.

79. A method for purifying a mixture comprising (i) an aromatic polyetherimide reaction product made by reaction of bisphenol A disodium salt and at least one of 1,4- and 1,3-bis[N-(4-chlorophthalimido)]benzene, (ii) a hexaalkylguanidinium chloride catalyst, (iii) sodium chloride, and (iv) anisole, comprising the steps of:
  (a) providing 0.3–5.0 volume % water to the reaction mixture;
  (b) heating to a temperature of at least about 110° C., wherein a portion of sodium chloride is in a form that can be filtered following the application of heat; and
  (c) filtering the reaction mixture at least once.

* * * * *